(12) United States Patent
Brncick et al.

(10) Patent No.: US 8,328,279 B2
(45) Date of Patent: Dec. 11, 2012

(54) VEHICLE SEAT PAD

(75) Inventors: Gregory Brncick, Holland, MI (US);
Robert Fender, Clarkston, MI (US);
Lola Lafferty, Capac, MI (US); Karen Brosnan, Eastpointe, MI (US)

(73) Assignee: Faurecia Automotive Seating, LLC, Troy, MI (US)

( * ) Notice: Subject to any disclaimer, the term of this patent is extended or adjusted under 35 U.S.C. 154(b) by 619 days.

(21) Appl. No.: 12/352,452

(22) Filed: Jan. 12, 2009

(65) Prior Publication Data

US 2010/0176633 A1 Jul. 15, 2010

(51) Int. Cl.
*A47C 31/00* (2006.01)
*A47C 7/02* (2006.01)

(52) U.S. Cl. .......... 297/228.11; 297/228.13; 297/452.55

(58) Field of Classification Search ............. 297/228.11, 297/218.4, 218.2, 452.55, 452.38, 452.48, 297/452.57, 228.12, 228.13, 219.11, 224
See application file for complete search history.

(56) References Cited

U.S. PATENT DOCUMENTS

| | | | |
|---|---|---|---|
| RE25,537 E * | 3/1964 | Larkin | 297/228.11 |
| 3,747,178 A * | 7/1973 | Harder, Jr. | 29/91.1 |
| 3,902,754 A | 9/1975 | Braeuning | |
| 4,065,181 A * | 12/1977 | Gunlock et al. | 297/440.22 |
| 4,588,229 A * | 5/1986 | Jay | 297/452.25 |
| 5,067,772 A * | 11/1991 | Koa | 297/452.55 |
| 5,288,136 A | 2/1994 | Webber et al. | |
| 5,518,802 A | 5/1996 | Colvin et al. | |
| 5,572,804 A | 11/1996 | Skaja et al. | |
| 5,976,451 A | 11/1999 | Skaja et al. | |
| 6,029,962 A | 2/2000 | Shorten et al. | |
| 6,098,313 A | 8/2000 | Skaja | |
| 6,777,062 B2 | 8/2004 | Skaja | |
| 7,033,666 B2 | 4/2006 | Skaja | |
| 7,574,760 B2 | 8/2009 | Foley et al. | |
| 2002/0050077 A1 | 5/2002 | Wang et al. | |
| 2002/0119276 A1 | 8/2002 | Skaja | |
| 2004/0067820 A1 | 4/2004 | Noble et al. | |
| 2005/0074586 A1 | 4/2005 | Skaja | |
| 2005/0126038 A1 | 6/2005 | Skaja et al. | |
| 2006/0177635 A1 | 8/2006 | Pepe et al. | |
| 2006/0277685 A1 | 12/2006 | Foley et al. | |
| 2008/0166524 A1 | 7/2008 | Skaja et al. | |

* cited by examiner

*Primary Examiner* — Milton Nelson, Jr.
(74) *Attorney, Agent, or Firm* — Reising Ethington P.C.

(57) ABSTRACT

A pad is adapted to set on a seat pan included in a vehicle seat. The pad includes a cushion on the seat pan and a cushion cover on the cushion.

8 Claims, 12 Drawing Sheets

VEHICLE SEAT PAD

BACKGROUND

The present disclosure relates to a vehicle seat, and particularly to seat pads included in seat bottoms and seat backs. More particularly, the present disclosure relates to cushion covers and cushion anchors in seat pads for vehicle seats.

SUMMARY

According to the present disclosure, a vehicle seat includes a seat pan mounted on a seat-pan support frame and a pad coupled to the seat pan. The pad can include a cushion and a cover on the cushion.

In illustrative embodiments, the cushion cover includes a first drawstring and is formed to include a drawstring channel. The first drawstring can be pulled tight during a seat assembly process to draw part of the cushion cover toward the cushion to retain the cushion cover on the cushion.

In illustrative embodiments, the cushion cover includes an inner sheet covering the cushion and an outer sheet covering the inner sheet. In one illustrative style of cushion, the outer sheet is formed to include the drawstring channel for the first drawstring. In another illustrative style of cushion, the inner sheet is formed to include the drawstring channel for the first drawstring.

In illustrative embodiments, the pad also includes a cushion retainer configured to provide means for retaining the cushion in a stationary position on an underlying seat pan. The cushion retainer is separated from the cushion cover in illustrative embodiments of the present disclosure to cause a portion of the perimeter edge of the cushion to remain exposed and uncovered.

In illustrative embodiments, the cushion retainer includes a second drawstring that can be pulled tight during a seat assembly process to hold the cushion in the stationary position. In a first version of a cushion retainer in accordance with the present disclosure, the second drawstring passes through a drawstring channel formed in a sheet formed to include an edge-receiving channel and applies, when pulled tight, a clamping force to clamp the sheet onto a perimeter edge of the pan extending into the edge-receiving channel formed in the sheet. In a second version of a cushion retainer in accordance with the present disclosure, the second drawstring passes through holes formed in a perimeter flange of the cushion and applies, when pulled tight, a clamping force to clamp the perimeter flange of the cushion onto the perimeter edge of the pan extending into an edge-receiving channel formed in the perimeter flange.

In illustrative embodiments, the cushion includes a deformable elastic bed and a cushion-mount strip coupled to the deformable elastic bed and formed to include an eyelet. The seat pan includes a tray arranged to underlie the deformable elastic bed and a rim coupled to the tray and arranged to lie alongside the cushion-mount strip. The seat pan also includes a fastener coupled to the rim and to the cushion-mount strip to retain the cushion in a stationary position on the tray of the seat pan. In a first version of the seat pan, the rim and the fastener cooperate to form a monolithic element. In a second version of the seat pan, the rim is formed to include a hole registered in alignment with a companion eyelet formed in the cushion-mount strip and the fastener is an element that is separate from the rim and arranged to pass through the hole and the companion eyelet to retain the cushion-mount strip of the cushion on the rim of the seat pan.

In illustrative embodiments, the cushion cover includes a sheet arranged to cover the cushion and a sheet anchor. The sheet anchor includes an anchor strip coupled to the cushion and a fastener configured to provide means for temporarily coupling the sheet to the anchor strip to retain the sheet in place on the cushion. In the illustrated embodiment, the fastener is a zipper.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIGS. 1-3 are a series of sectional views showing three illustrative embodiments of an occupant-support base (e.g., seat bottom) included in a vehicle seat and configured to be coupled to a seat-pan support frame included in the vehicle seat;

FIGS. 7*a*-7*f* show three techniques in accordance with the present disclosure for rigidifying a perimeter portion of a cushion that is coupled to a cushion cover;

FIGS. 8-11 show a process for forming a drawstring channel in the outer sheet included in the first style of cushion cover shown in FIGS. 1 and 4-6;

FIGS. 12-14 show a process for forming a drawstring channel in the inner sheet included in the second style of cushion cover shown in FIG. 2;

DETAILED DESCRIPTION

Figures 1, 2, 3:
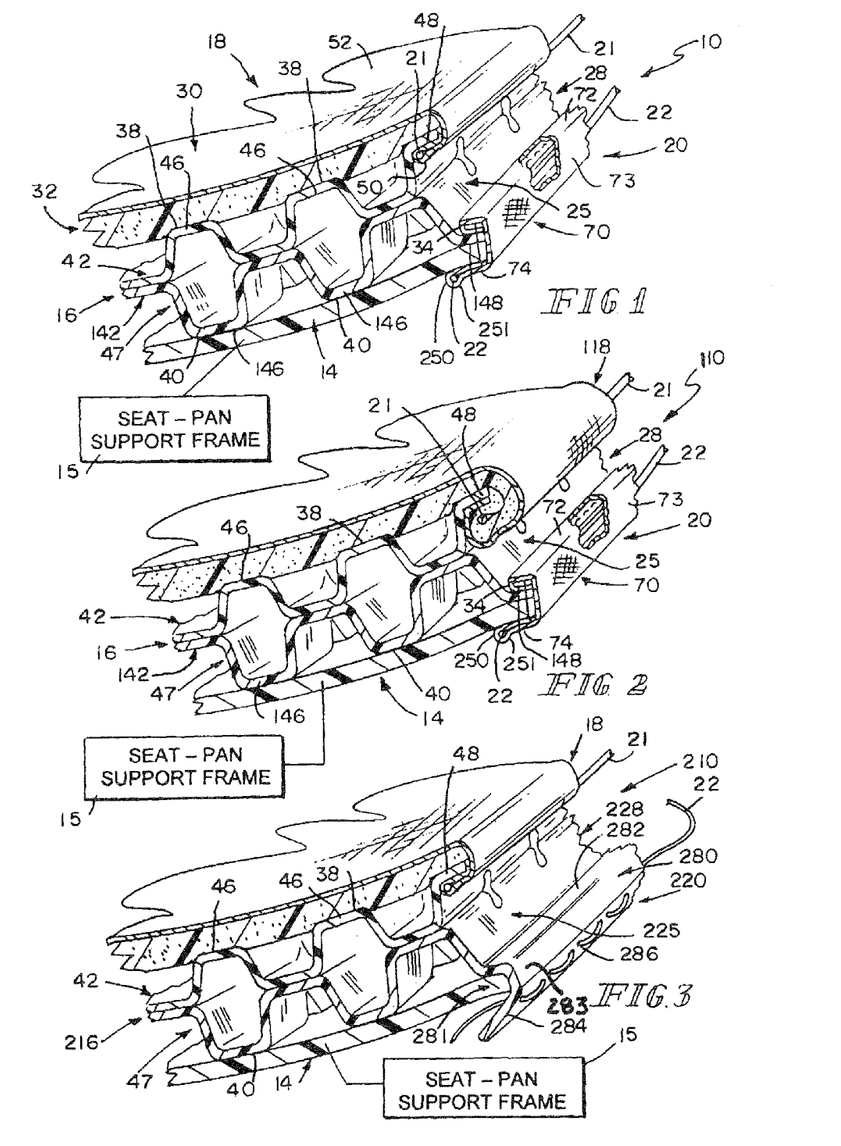
FIG. 1 is a sectional view of an occupant-support base (e.g., seat bottom) in accordance with a first embodiment of the present disclosure showing use of a first drawstring to couple a first style of cushion cover to a multi-chamber cushion and use of a second drawstring in a first version of a cushion retainer separated from the cushion cover to retain the multi-chamber cushion in place on an underlying seat pan.
FIG. 2 is a sectional view of an occupant-support base in accordance with a second embodiment of the present disclosure showing use of a first drawstring to couple a second style of cushion cover to the multi-chamber cushion and showing the same cushion retainer shown in FIG. 1.
FIG. 3 is a sectional view of an occupant-support base in accordance with a third embodiment of the present disclosure showing a second drawstring in a second version of a cushion retainer separated from the cushion cover and showing use of the second drawstring to trap a perimeter edge of the seat pan inside an edge-receiving channel formed in a perimeter flange included in the multi-chamber cushion.
Figures 4, 6:
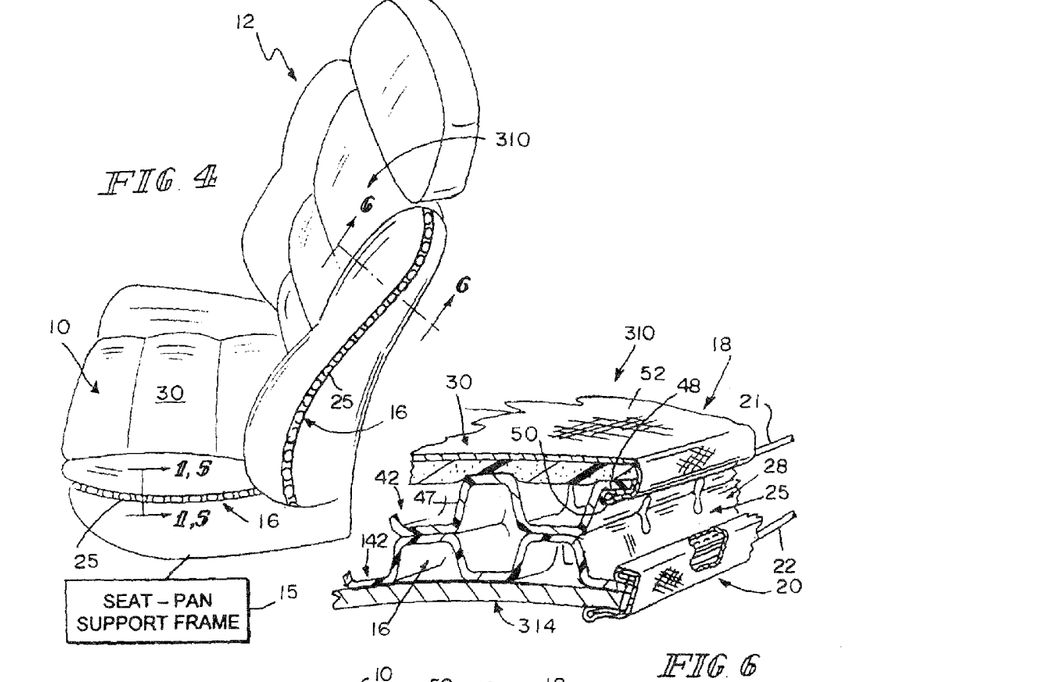
FIG. 4 is a perspective view of a vehicle seat including a seat bottom embodying the occupant-support base shown in section in FIG. 1 and including a seat back constructed in a manner similar to the seat bottom.
FIG. 6 is an enlarged sectional view taken along line 6-6 of FIG. 4 of the seat back included in the vehicle seat shown in FIG. 4.

An occupant-support base 10 (e.g., seat bottom) is shown in section in FIG. 1 and in perspective (as part of vehicle seat 12) in FIG. 4. Other illustrative occupant-support bases 110, 210 in accordance with the present disclosure are shown in section in FIGS. 2 and 3. Another occupant-support base 310 is configured to provide a seat back in vehicle seat 12 as shown in perspective in FIG. 4 and in section in FIG. 6.

Occupant-support base 10 includes a seat pan 14 coupled to a seat-pan support frame 15 underlying seat pan 14, a cushion 16 on seat pan 14, a cushion cover 18 coupled to cushion 16, and a cushion retainer 20 coupled to seat pan 14 and cushion 16 as shown, for example, in FIG. 1. Cushion retainer 20 is separated from cushion cover 18 as suggested in FIG. 1 to cause an intermediate portion 25 of a perimeter edge 28 of cushion 16 to remain uncovered and exposed. A first drawstring 21 is included in cushion cover 18 and used to hold cushion cover 18 in place on cushion 16 in an illustrative embodiment as suggested in FIGS. 1, 4, 5, and 11. A second drawstring 22 is included in cushion retainer 20 and used to hold cushion 16 in place on seat pan 14 in an illustrative embodiment as suggested in FIGS. 1, 4, and 5.

Figure 12:
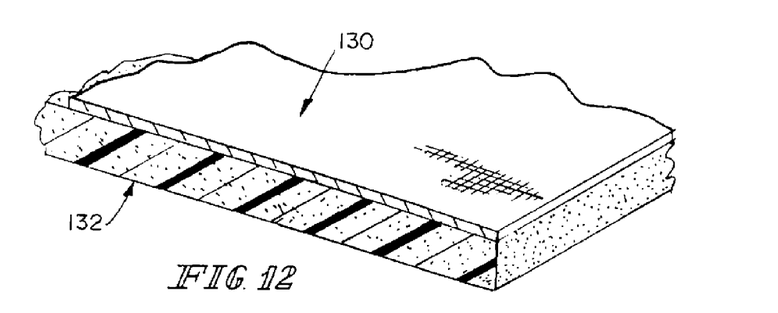
FIG. 12 is an enlarged partial perspective view of the second style of cushion cover showing an outer sheet coupled to an underlying inner sheet.

As shown in FIG. 2, occupant-support base 110 includes seat pan 14 coupled to a companion seat-pan support frame 15, cushion 16 on seat pan 14, a cushion cover 118 coupled to cushion 16, and cushion retainer 20. Cushion retainer 20 is separated from cushion cover 118 as suggested in FIG. 2 to expose intermediate portion 25 of perimeter edge 28 of cushion 16 when cushion 16 is retained in place on seat pan 14. A first drawstring 21 is included in cushion cover 118 and used to hold cushion cover 118 in place on cushion 16 as suggested in FIGS. 2 and 12. A second drawstring 22 is included in cushion retainer 20 and used to hold cushion 16 in place as suggested in FIG. 2.

As shown in FIG. 3, occupant-support base 210 includes seat pan 14 coupled to a companion seat-pan support frame 15, cushion 216, cushion cover 18 coupled to cushion 216, and cushion retainer 220. Cushion retainer 220 is separated from cushion cover 18 to cause intermediate portion 225 of a perimeter edge 228 of cushion 216 to remain uncovered and exposed when cushion 216 is retained in place on seat pan 14 as suggested in FIGS. 3 and 17. A first drawstring is included in cushion cover 18 and used to hold cushion cover 18 in place on cushion 216 as suggested in FIG. 3. A second drawstring 22 is included in cushion retainer 220 and used to hold cushion 216 in place as suggested in FIGS. 3 and 17.

Figure 5:
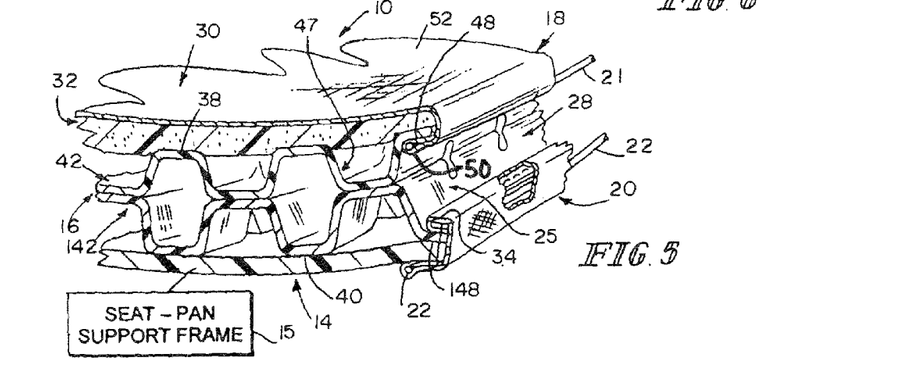
FIG. 5 is an enlarged sectional view taken along line 5-5 of FIG. 4 of the seat bottom of the vehicle seat shown in FIG. 4.
Figure 7:
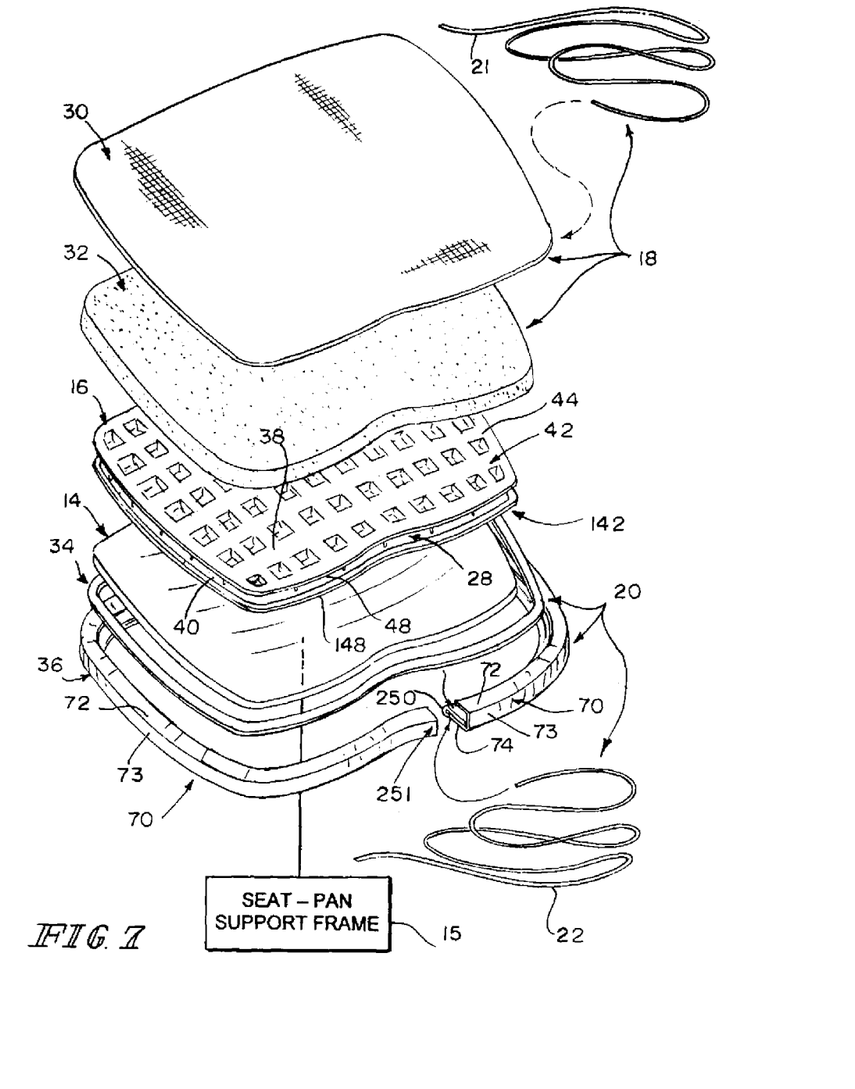
FIG. 7 is an exploded perspective assembly view of the components that comprise the occupant-support base providing the seat bottom of the vehicle seat shown in FIG. 4 showing, from top to bottom, a cushion cover including an outer sheet, an inner sheet, and a first drawstring, a multi-chamber cushion, a seat pan, and a cushion retainer including a stiffener ring, a folded sheet formed to include a drawstring channel, and a second drawstring.

An exploded perspective assembly view of components that, when assembled, cooperate to form occupant-support base 10 shown in FIGS. 1 and 5 is provided in FIG. 7. Outer sheet 30, inner sheet 32, and first drawstring 21 are assembled, for example, for example, using an illustrative process shown in FIGS. 8-11 to produce cushion cover 18. Occupant-support base 10 also includes a cushion 16 under inner sheet 32 and a seat pan 14 under cushion 16. A stiffener ring 34, a ring-shaped folded sheet 36, and second drawstring 22 are assembled as suggested in FIG. 7 to produce cushion retainer 20.

In illustrative embodiments, cushion 16 is made of an elastomer such as thermoplastics polyurethane (TPU) material having a multi-chamber construction as suggested in FIGS. 1, 2, and 7. Cushion 216 is made of a TPU material in a similar manner. It is within the scope of the present disclosure to use other materials to make cushions 16, 216.

As suggested in FIGS. 1 and 7, cushion 16 includes a top surface 38, a bottom surface 40, and a perimeter edge 28 extending between top and bottom surfaces 38, 40. In illustrative embodiments, cushion 16 includes a top shell 42 including a plate 44 providing top surface 38 and a series of spaced-apart downwardly projecting domes 46 arranged in a grid of rows and columns and coupled to plate 44, and a cover-mount flange 48 coupled to plate 44 and arranged to extend around the perimeter of top shell 42. Cushion 16 also includes a bottom shell 142 including a plate 144 providing bottom surface 40 and a series of spaced-apart upwardly projecting domes 146 arranged in a grid of rows and columns and coupled to plate 144, and a retainer-mount plate 148 coupled to plate 144 and arranged to extend around the perimeter of bottom shell 142. Domes 46 and 146 are aligned in base-to-base registration as suggested in FIG. 1 and cooperate with plates 44, 144 to form a deformable elastic bed 47 coupled to cover-mount flange 48 and retainer-mount flanges 148. These flanges 48, 148 are arranged to lie in spaced-apart relation to one another as suggested in FIGS. 1 and 7.

Figure 11:
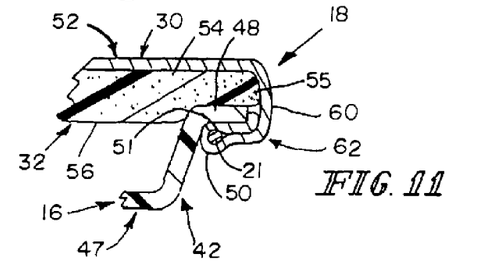
FIG. 11 is an enlarged partial sectional view of the occupant-support base of FIGS. 1 and 5 after the first drawstring has been pulled tight to couple the first style of cushion cover to the underlying cushion.
Figure 14:
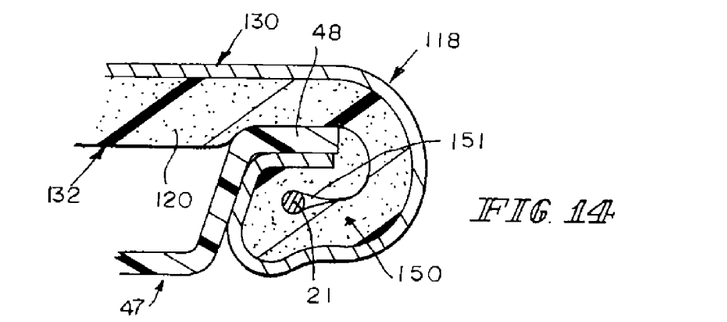
FIG. 14 is an enlarged partial sectional view of the occupant-support base of FIG. 2 after the first drawstring has been pulled tight to couple the second style of cushion cover to the underlying cushion.
Figure 15:
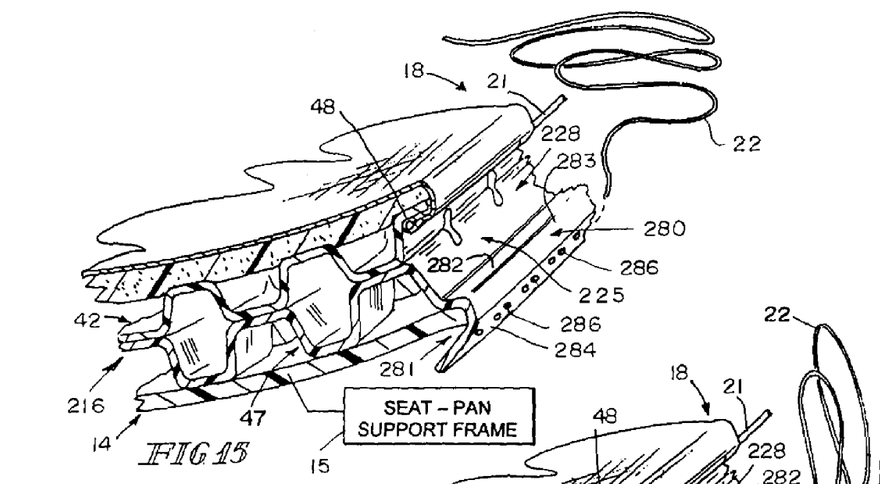
FIGS. 15-17 show a process in accordance with the present disclosure for using a second drawstring to trap a perimeter edge of the seat pan inside an edge-receiving channel formed in a perimeter flange included in a multi-chamber cushion in a second version of a cushion retainer in accordance with the present disclosure to produce the occupant-support base shown in FIG. 3.
Figure 16:
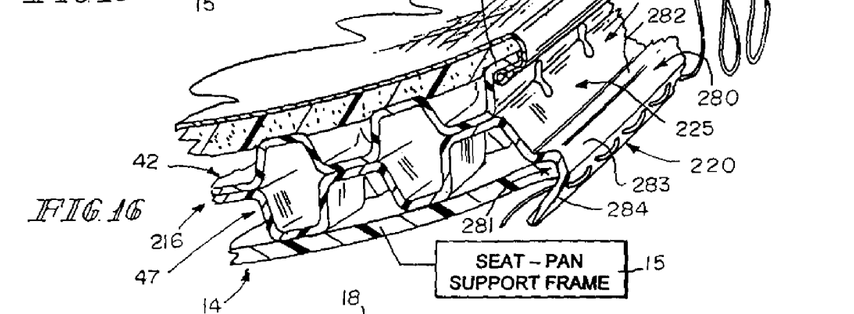

Cushion cover 18 shown in FIGS. 1 and 11 represents a first style of cushion cover in accordance with the present disclosure. In contrast, cushion cover 118 shown in FIGS. 2 and 14 represents a second style of cushion cover in accordance with the present disclosure. Each of cushion covers 18, 118 includes a first drawstring 21 in illustrative embodiments of the present disclosure.

Cushion cover 18 includes a first drawstring carrier 50 formed to include a first drawstring channel 51 and arranged to mate with cushion 18 and a first drawstring 21 arranged to extend through first drawstring channel 51. Drawstring 21 is configured to provide means for drawing first drawstring carrier 50 toward cushion 16 to retain cushion cover 18 on cushion 16.

Cushion cover 18 includes an inner sheet 32 covering cushion 16 and an outer sheet 30 covering the inner sheet as suggested in FIGS. 1 and 11. Outer sheet 30 is formed to include first drawstring channel 51 as suggested in FIGS. 1, 10, and 11.

Outer sheet 30 includes drawstring carrier 50 and a panel 52 coupled to inner sheet 32 and to drawstring carrier 50. Drawstring carrier 50 engages cover-mount flange 48 as suggested in FIGS. 1 and 11 in response to tightening movement of first drawstring 21 in first drawstring channel 51 to retain cushion cover 18 on cushion 16.

Inner sheet 32 includes a top surface 54 facing toward outer sheet 30, a bottom surface 56 facing toward cushion 16, and an end edge 55 extending between top and bottom surfaces 54, 56 as suggested in FIGS. 8-11. Cover-mount flange 48 of cushion 16 is located in a space provided between bottom surface 56 of inner sheet 32 and drawstring carrier 50 of cushion 16. Panel 52 of outer sheet 30 includes a top section 58 facing toward top surface 54 of inner sheet 32 and an end section 60 facing toward end edge 55 of inner sheet 32 and interconnecting top section 58 and drawstring carrier 50 as shown, for example, in FIG. 11.

Outer sheet 30 includes a top section 58 coupled to inner sheet 32 and a perimeter strip 62 appended to top section 58. Perimeter strip 62 is configured to include a folded section 64 formed to include first drawstring channel 51 and an end section 60 arranged to interconnect folded section 64 and top section 58. Inner sheet 32 includes a top surface 54 facing toward top section 58 of outer sheet 30, a bottom surface 56 facing toward cushion 16, and an end edge 55 facing toward end section 60 of perimeter strip 62 of outer sheet 30.

Figure 13:
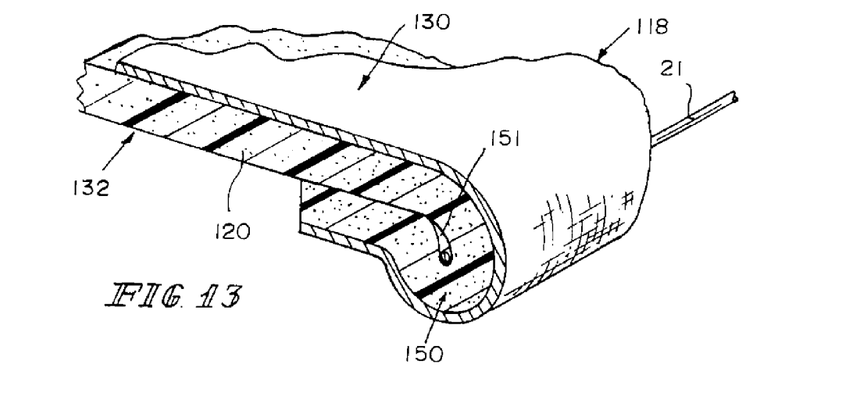
FIG. 13 is a view similar to FIG. 12 showing folding of the cushion cover to cause a drawstring channel to be formed between two neighboring portions of the inner sheet.

Cushion cover 118 includes a first drawstring carrier 150 formed to include a first drawstring channel 151 and arranged to mate with cushion 118 and a first drawstring 21 arranged to extend through first drawstring channel 151 as suggested in FIGS. 2, 13, and 14. Drawstring 21 is configured to provide means for drawing first drawstring carrier 50 toward cushion 16 to retain cushion cover 118 on cushion 16.

Cushion cover 118 includes an inner sheet 132 covering cushion 16 and an outer sheet 130 covering inner sheet 132. Inner sheet 132 is formed to include first drawstring channel 51 as shown in FIGS. 2, 13, and 14.

Inner sheet 132 includes drawstring carrier 150 and a panel 120 coupled to outer sheet 130 and to drawstring carrier 150. Drawstring carrier 150 and panel 120 cooperate to trap cover-mount flange 48 therebetween in response to tightening movement of first drawstring 21 in first drawstring channel 151 to retain cushion cover 118 on cushion 16. A portion of inner sheet 132 is interposed between cover-mount flange 48 and outer sheet 130. A portion of outer sheet 130 is interposed between drawstring carrier 150 and cover-mount flange 48.

Figure 17:
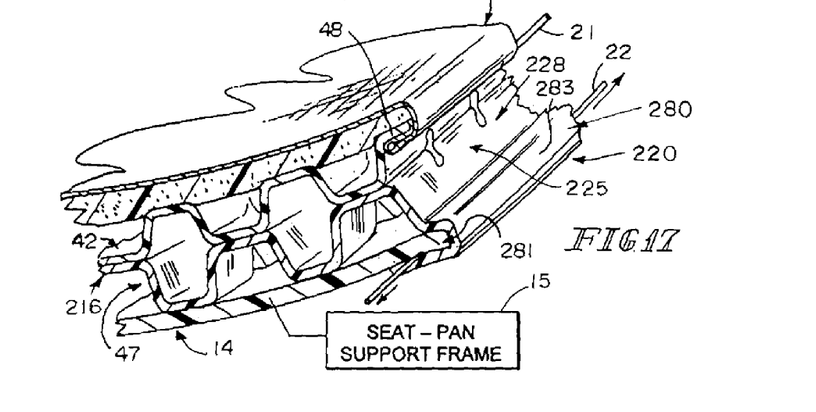

Cushion retainer 20 shown in FIGS. 1 and 2 represents a first version of cushion retainer in accordance with the present disclosure. In contrast, cushion retainer 220 shown in FIGS. 3 and 17 represents a second version of cushion retainer in accordance with the present disclosure. Each of cushion retainers 20, 220 includes a second drawstring in illustrative embodiments of the present disclosure.

Cushion retainer 20 is separated from cushion cover 18 as shown in FIGS. 1 and 2. Cushion retainer 20 is coupled to each of cushion 16 and seat pan 14 to retain cushion 16 in a stationary position on seat pan 14.

Cushion 16 includes a top surface 38 facing upwardly toward cushion cover 18, a bottom surface 40 facing downwardly toward seat pan 14, and a perimeter edge 28 extending between top and bottom surfaces 38, 40. Cushion cover 18 covers an upper portion of perimeter edge 28 of cushion 16 while cushion retainer 20 covers a lower portion of perimeter edge 28 of cushion 16 to cause an intermediate portion 25 of perimeter edge 28 extending between the upper and lower portions to remain uncovered and exposed as suggested in FIGS. 1 and 2.

Cushion retainer 20 includes a second drawstring 22 and a ring-shaped folded sheet 70 including a second drawstring carrier 250 formed to include a second drawstring channel 251 as suggested in FIG. 1. Folded sheet includes a top rim 72 arranged to mate with cushion 16, a bottom rim 74 arranged to mate with seat pan 14 and configured to define second drawstring carrier 250, and an outer rim 73 arranged to interconnect top and bottom rims 72, 74 and cover edge portions of cushion 16 and seat pan 14. Second drawstring 221 is arranged to extend through second drawstring channel 251 and configured to provide means for drawing bottom rim 74 of cushion retainer 20 toward seat pan 14 to retain cushion 16 in the stationary position on seat pan 14.

Cushion retainer 220 includes a perimeter flange 280 coupled to cushion 216 and formed to include an edge-receiving channel 282 receiving the perimeter edge of seat pan 14 therein. Perimeter flange 288 includes a top rim 282 arranged to mate with an upwardly facing surface of seat pan 14, a bottom rim 284 arranged to mate with a downwardly facing surface of seat pan 14. Perimeter edge of seat pan 14 is arranged to extend between the upwardly and downwardly facing surfaces. Cushion retainer 220 further includes a second drawstring 22 arranged to pass through a series of apertures 286 formed in bottom rim 284 of perimeter flange 288 and configured to provide means for drawing bottom rim 284 of perimeter flange 288 toward seat pan 14 to retain cushion 216 in the stationary position on seat pan 14.

An illustrative vehicle seat 12 is shown in FIG. 4 to include a first occupant-support base 10 (e.g., seat bottom) and a second occupant-support base 310 (e.g., seat back). An exposed intermediate portion 25 of cushion 16 is visible to a nearby observer in a side wall of each of seat bottom 10 and seat back 310 as shown, for example, in FIG. 4. Each of seat bottom 10 and seat back 310 has a similar construction as suggested in the sectional views provided in FIGS. 5 and 5. As suggested in FIGS. 4 and 5, cushion retainer 20 retains cushion 16 in a stationary position on a generally horizontal seat pan 14 included in seat bottom 10 of vehicle seat 12. As suggested in FIGS. 4 and 6, cushion retainer 20 retains cushion in a stationary position on a generally upright seat pan 314 included in seat back 310 of vehicle seat 12.

As suggested in FIGS. 1 and 7, cushion 16 includes a top shell 42 mated to an underlying bottom shell 142 to form a deformable elastic bed. In illustrative embodiments, each of top and bottom shells, 42, 142 are made of an elastomer such as thermoplastics polyurethane (TPU) material. As suggested in FIGS. 7a-7f, it is within the scope of the present disclosure to rigidify a pliable perimeter portion (e.g., cover-mount flange 48) of plate 44 included in top shell 42 using, for example, an integral perimeter ridge 243 (see FIGS. 7a, 7b), a top-mounted perimeter band 343 (see FIGS. 7c, 7d) and a bottom-mounted perimeter band 443 (see FIGS. 7e, 7f). It is with the scope of the present disclosure to add similar rigidifications to a pliable perimeter portion (e.g., retainer-mount flange 148) of plate 144 included in bottom shell 142.

Figure 7A:
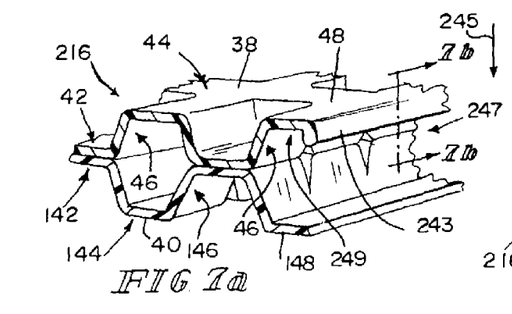
FIG. 7*a* is a sectional view of a portion of a cushion in accordance with a second embodiment of the present disclosure showing that a top shell mates with an underlying bottom shell to form a cushion and that the top shell includes a plate, a series of spaced-apart downwardly projecting domes coupled to the plate, a cover-mount flange coupled to the plate, and a downwardly extending stiffener ridge coupled to a perimeter edge of the cover-mount flange.
Figure 7B:
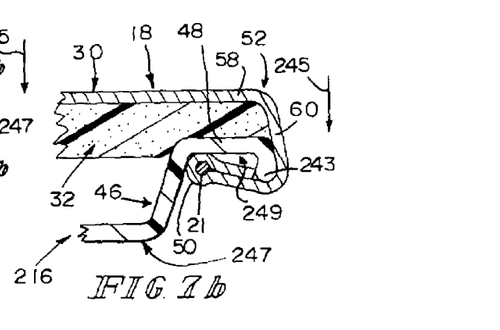
FIG. 7b is an enlarged sectional view taken along line 7b-7b of FIG. 7a after a cushion cover has been coupled to the top shell of the cushion and wrapped around the downwardly extending stiffener ridge.

As suggested in FIG. 7a, a stiffener such as a downwardly extending stiffener ridge 243 is coupled to cover-mount flange 48 of top shell 42 to create a cushion 216. In an illustrative embodiment, stiffener ridge 243 is coupled to a perimeter edge of cover-mount flange 48. In the illustrated embodiment, stiffener ridge 243 is made of an elastomeric material and cooperates with the top shell 42 which is made of the same elastomeric material to form a monolithic member. As suggested in FIG. 7b, cushion cover 18 is wrapped around downwardly extending stiffener ridge 243. Stiffener ridge 243 provides means for rigidifying cover-mount flange 48 and blocking separation of drawstring carrier 50 of outer sheet 30 of cushion cover 18 from top shell 42 (and a deformable elastic bed 247 included in cushion 216 and coupled to cover-mount flange 48) after first drawstring 21 has been tightened to retain cushion cover 18 on cushion 216. Stiffener ridge 243 is arranged to extend in a downward direction 245 toward seat pan 14 to lie in spaced-apart relation to a deformable elastic bed 247 included in cushion 216 as suggested in FIG. 7b to locate drawstring carrier 50 and first drawstring 21 in a downwardly opening channel 249 bounded by deformable elastic bed 247, cover-mount flange 48, and stiffener ridge 243.

Figure 7C:
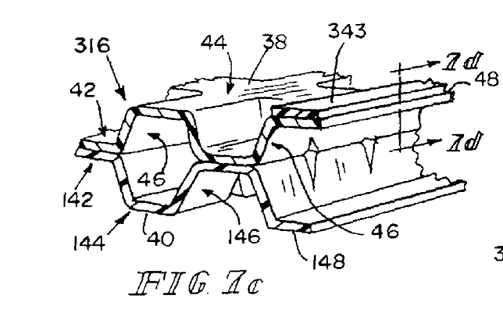
FIG. 7c is a sectional view of a portion of a cushion in accordance with a third embodiment of the present disclosure showing that the top shell of the cushion includes a cover-mount flange and a stiffener band mounted on an upwardly facing surface of the cover-mount flange along a perimeter edge of the top shell.
Figure 7D:
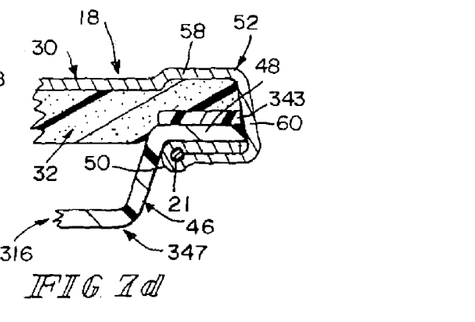
FIG. 7d is an enlarged sectional view taken along line 7d-7d of FIG. 7c after a cushion cover has been coupled to the top shell of the cushion to cover the stiffener band.

As suggested in FIG. 7c, a stiffener such as a stiffener band 343 is mounted on an upwardly facing surface of cover-mount flange 48 along a perimeter edge of top shell 42 to create a cushion 316. Cover-mount flange 48 is arranged to lie between stiffener band 343 and seat pan 14. In illustrative embodiments, stiffener band 343 is adhered to or retained on cover-mount flange 48 using any suitable means. As suggested in FIG. 7d, cushion cover 18 is wrapped around stiffener band 343 and cover-mount flange 48. Stiffener band 343 provides means for rigidifying cover-mount flange 48 to block unauthorized separation of drawstring carrier 50 of outer sheet 30 of cushion cover 18 from top shell 42 and a deformable elastic bed 347 coupled to cover-mount flange 48 after first drawstring 21 has been tightened to retain cushion cover 18 on cushion 316. It is within the scope of the present disclosure to form an upwardly opening channel (not shown) in cover-mount flange 48 to receive stiffener band 343 therein.

Figure 7E:
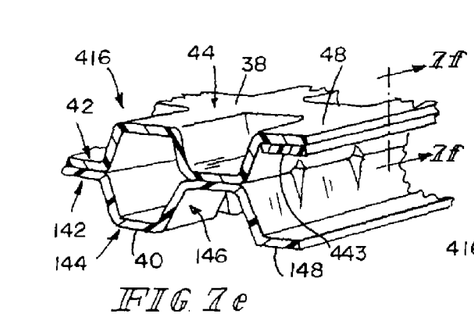
FIG. 7e is a sectional view of a portion of a cushion in accordance with a fourth embodiment of the present disclosure showing that the top shell of the cushion includes a cover-mount flange and a stiffener band mounted on a downwardly facing surface of the cover-mount flange along a perimeter edge of the top shell.
Figure 7F:
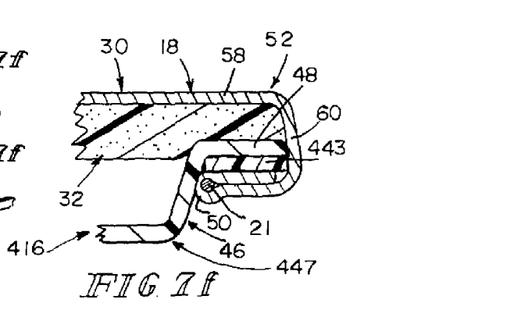
FIG. 7f is an enlarged sectional view taken along line 7f-7f of FIG. 7e after a cushion cover has been coupled to the top shell of the cushion to cover the stiffener band.
Figure 8:
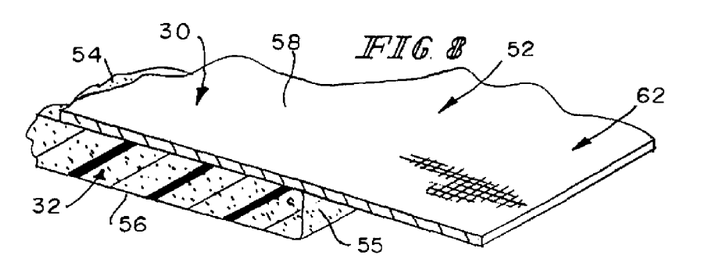
FIG. 8 is an enlarged partial perspective view of the first style of cushion cover showing an outer sheet coupled to an underlying inner sheet to produce a perimeter strip having a perimeter edge.
Figures 9, 10:
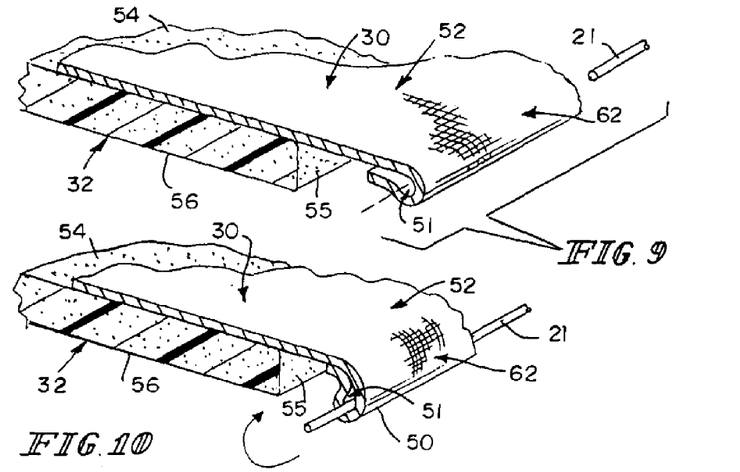
FIG. 9 is a view similar to FIG. 8 showing folding of the perimeter strip of the outer sheet to form a drawstring channel.
FIG. 10 is a view similar to FIG. 9 showing that the perimeter edge is coupled to an underside of the perimeter strip and that the first drawstring is passed through the drawstring channel.

As suggested in FIG. 7e, a stiffener such as a stiffener band 443 is mounted on a downwardly facing surface of cover-mount flange 48 along a perimeter edge of top shell 42 to create a cushion 416. Stiffener band 443 is arranged to lie between cover-mount flange 48 and seat pan 14. In illustrative embodiments, stiffener band 443 is adhered to or retained on cover-mount flange 48 using any suitable means. As suggested in FIG. 7f, cushion cover 18 is wrapped around stiffener band 443 and cover-mount flange 48. Stiffener band 443 provides means for rigidifying cover-mount flange 48 to block unauthorized separation of drawstring carrier 50 of outer sheet 30 of cushion cover 18 from top shell 42 and a deformable elastic bed 447 coupled to cover-mount flange 48 after first drawstring 21 has been tightened to retain cushion cover 18 on cushion 416. It is within the scope of the present disclosure to form a downwardly opening channel (not shown) in cover-mount flange 48 to receive stiffener band 443 therein.

Figures 18, 19:
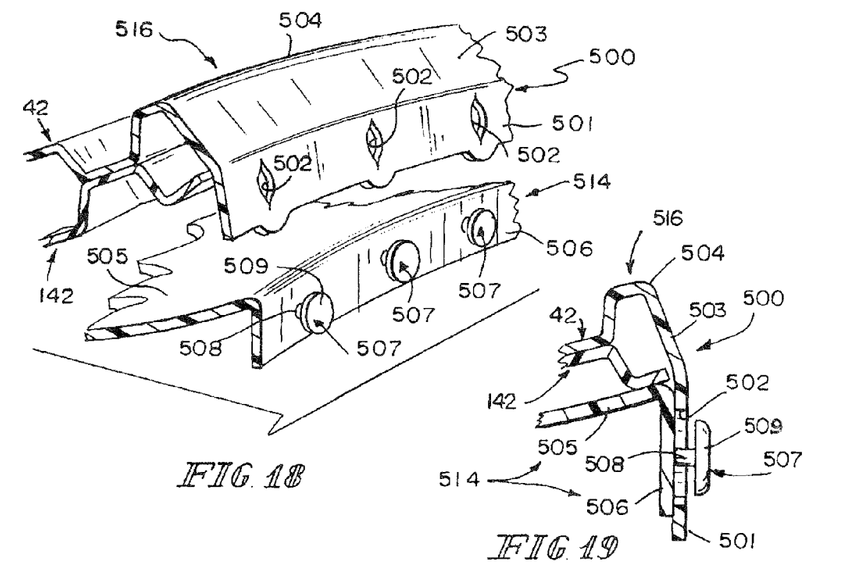
FIGS. 18-20 show another process in accordance with the present disclosure for retaining the cushion in a stationary position on the seat pan by inserting stationary fasteners (e.g., buttons) appended to the seat pan into eyelets formed in a cushion-mount strip coupled to the top shell of the cushion.
Figures 20, 21:
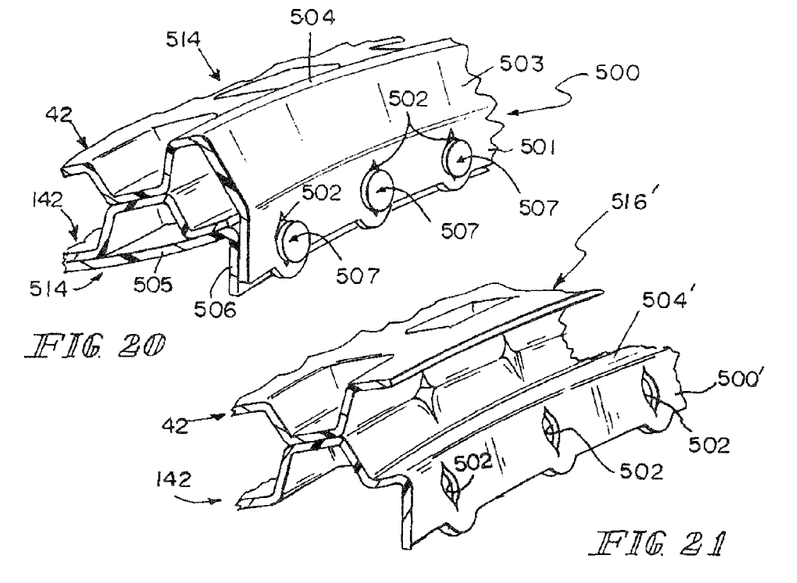
FIG. 21 is another embodiment of a cushion configured to be mounted on an underlying seat pan using stationary fasteners (e.g., buttons) except that the cushion-mount strip is coupled to the bottom shell of the cushion.

An illustrative process in accordance with the present disclosure for retaining a cushion 516 in a stationary position on an underlying seat pan 514 is shown in FIGS. 18-20. Cushion 516 includes a bottom shell 142 adapted to mount on seat pan 514, a top shell 42 coupled to bottom shell 142, and a cushion-mount strip 500 coupled to top shell 42. Cushion-mount strip 500 includes a lower panel 501 formed to include a series of eyelets 502 and an upper panel 503 arranged to interconnect lower panel 501 and a perimeter border 504 of top shell 42. Seat pan 514 includes a tray 505 arranged to underlying bottom shell 142 of cushion 516, a rim 506 coupled to a perimeter portion of tray 505, and a series of spaced-apart fasteners 507 coupled to rim 506 and arranged to extend away from tray 505 as shown in FIGS. 18 and 19.

In an illustrative embodiments, cushion-mount strip 500 is made of the same elastomeric material used to make top shell 42 and strip 500 and shell 42 cooperate to form a monolithic component. Similarly, fasteners 507 are made of the same material used to make seat pan 514 and cooperate to form a monolithic component. Each fastener 507 is shaped to form a button in an illustrative embodiment and includes a post 508 arranged to pass through a companion eyelet 502 and a head 509 coupled to a free end of post 508 and arranged to lie in spaced-apart relation to rim 506 to trap lower panel 501 therebetween when cushion 516 is anchored on seat pan 514 as suggested in FIG. 19.

In an alternative embodiment shown, for example, in FIG. 21, a cushion-mount strip 500' is coupled to bottom shell 142 along a perimeter border 504' of bottom shell 142. Cushion-mount strip 500' is made of the same elastomeric material used to make bottom shell 142 and strip 500' and shell 142 cooperate to form a monolithic element. Strip 500' can be coupled to fasteners 507 included in seat pan 514 to mount cushion 516' to seat pan 514.

The fixation methodology suggested in the embodiments illustrated in FIGS. 18-21 can be used for seat bases and seat backs and can be implemented on any and all rows of seating in a vehicle. This fixation methodology facilitates attachment of a cushion to a seat pan in a just-in-time assembly process. The button design replaces gluing options and enhances the ability to dissemble the cushion and seat pan at end of life for recycling.

Figures 22, 23, 23A, 23B, 24, 25:
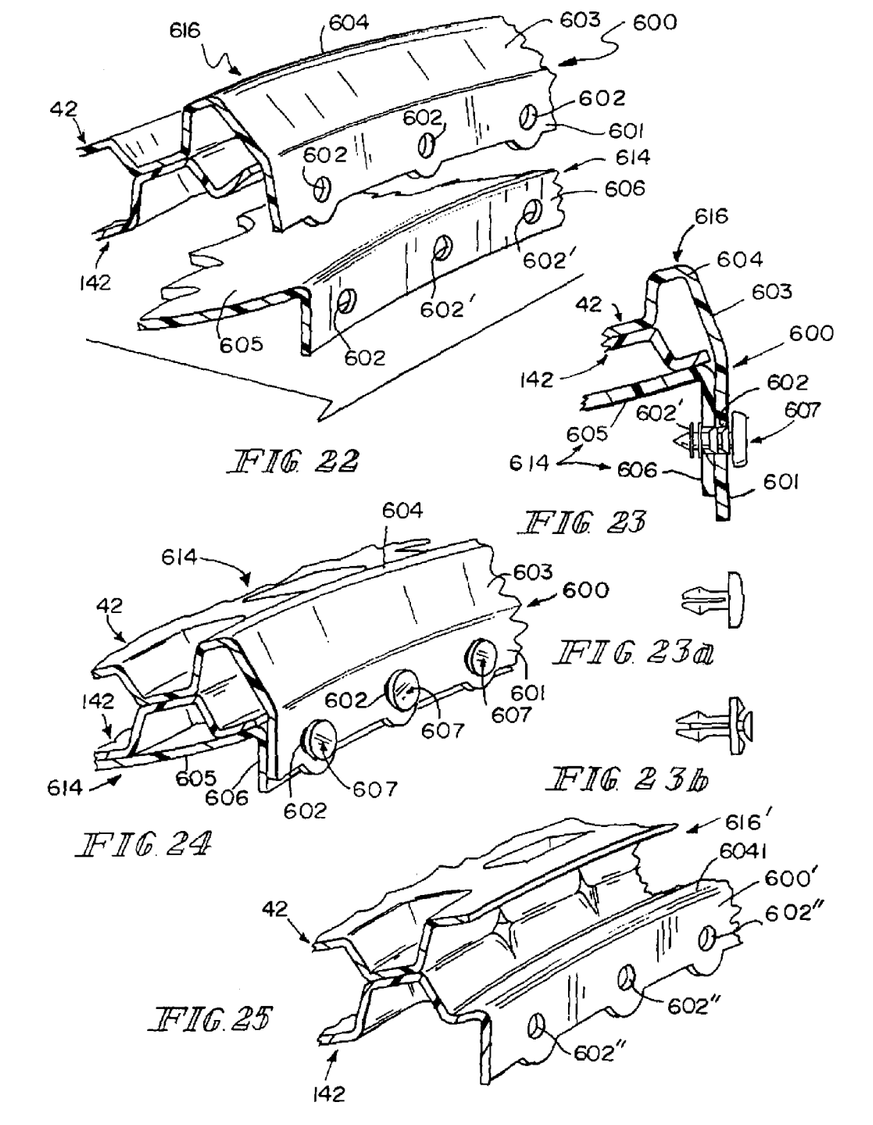
FIGS. 22-24 show yet another process in accordance with the present disclosure for retaining the cushion in a stationary position on the seat pan by inserting push-clip fasteners into eyelets formed in a cushion-mount strip coupled to the top shell of the cushion and holes formed in the seat pan.
FIG. 25 is another embodiment of a cushion configured to be mounted to an underlying seat pan using push-clip fasteners except that the cushion-mount strip is coupled to the bottom shell of the cushion.

An illustrative process in accordance with the present disclosure for retaining a cushion 616 in a stationary position on an underlying seat pan 614 is shown in FIGS. 22-24. Cushion 616 includes a bottom shell 142 adapted to mount on seat pan 614, a top shell 42 coupled to bottom shell 142, and a cushion-mount strip 600 coupled to top shell 42. Cushion-mount strip 600 includes a lower panel 601 formed to include a series of holes 602 and an upper panel 603 arranged to interconnect lower panel 601 and a perimeter border 604' of top shell 42. Seat pan 614 includes a tray 605 arranged to underlying bottom shell 142 of cushion 616 and a rim 606 coupled to a perimeter portion of tray 605. A series of spaced-apart holes 602' are formed in rim 606 as shown in FIGS. 22 and 23. In illustrative embodiments, cushion-mount strip 600 is made of the same elastomeric material used to make top shell 42 and strip 600 and shell 42 cooperate to form a monolithic component.

Fasteners 607 are used to retain lower panel 601 of cushion-mount strip 600 in a fixed position on rim 606 to mount cushion 616 in a stationary position on seat pan 614 as suggested in FIGS. 23 and 24. Cushion-mount strip 600 is positioned to lie alongside rim 606 to locate each eyelet (hole) 602 in registry with a companion hole 602'. Each fastener 607 includes a post 608 arranged to pass through companion holes 602, 602' and a head 609 coupled to a free end of post 608 and arranged to lie in spaced-apart relation to rim 606 to trap lower panel 601 therebetween when cushion 616 is anchored on seat pan 614 as suggested in FIG. 23. Fastener 607 is a push-clip type fastener and other suitable fasteners are illustrated in FIGS. 23a and 23b.

In an alternative embodiment shown, for example, in FIG. 25, a cushion-mount strip 600' is coupled to bottom shell 142 along a perimeter border 604' of bottom shell 142 and formed to include holes 602". Cushion-mount strip 600' is made of the same elastomeric material used to make bottom shell 142 and strip 600' and shell 142 cooperate to form a monolithic element. Strip 600' can be anchored to rim 606 included in seat pan 614 to mount cushion 616' to seat pan 614.

The fixation methodology suggested in the embodiments illustrated in FIGS. 22-24 can be used for seat bases and seat backs and can be implemented on any and all rows of seating in a vehicle. This fixation methodology facilitates attachment of a cushion to a seat pan in a just-in-time assembly process. The button design replaces gluing options and enhances the ability to dissemble the cushion and seat pan at end of life for recycling.

Figure 26:
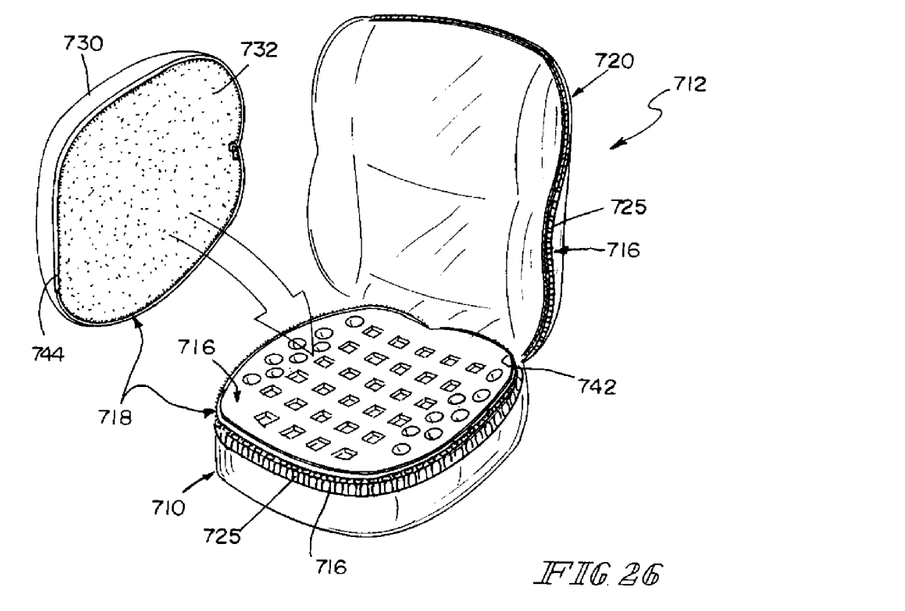
FIGS. 26-30 show use of a fastener (e.g., zipper) to couple a cushion cover temporarily to a cushion.
Figure 27:
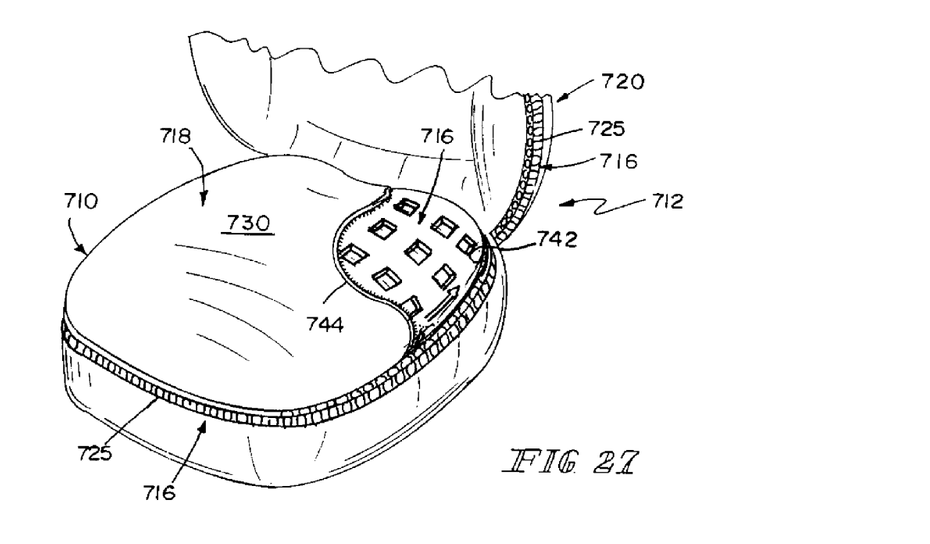

An illustrative vehicle seat 712 in accordance with another embodiment of the present disclosure is shown in FIGS. 26 and 27. Vehicle seat 712 includes a first occupant-support base 710 (e.g., seat bottom) and a second occupant-support base 720 (e.g., seat back). An exposed intermediate portion 725 of cushion 716 is visible to a nearby observer in a side wall of each of seat bottom 710 and seat back 720 as shown, for example, in FIGS. 26 and 27.

As suggested in FIG. 26, seat bottom 710 includes a cushion 716 and a cushion cover 718 configured to be coupled to cushion 716. Cushion 716 has a construction that is the same as cushion 16 shown in FIGS. 1, 4, and 5 in an illustrative embodiment. It is within the scope of the present disclosure to couple cushion 716 to an underlying seat pan 714 using any suitable means.

Figure 28:
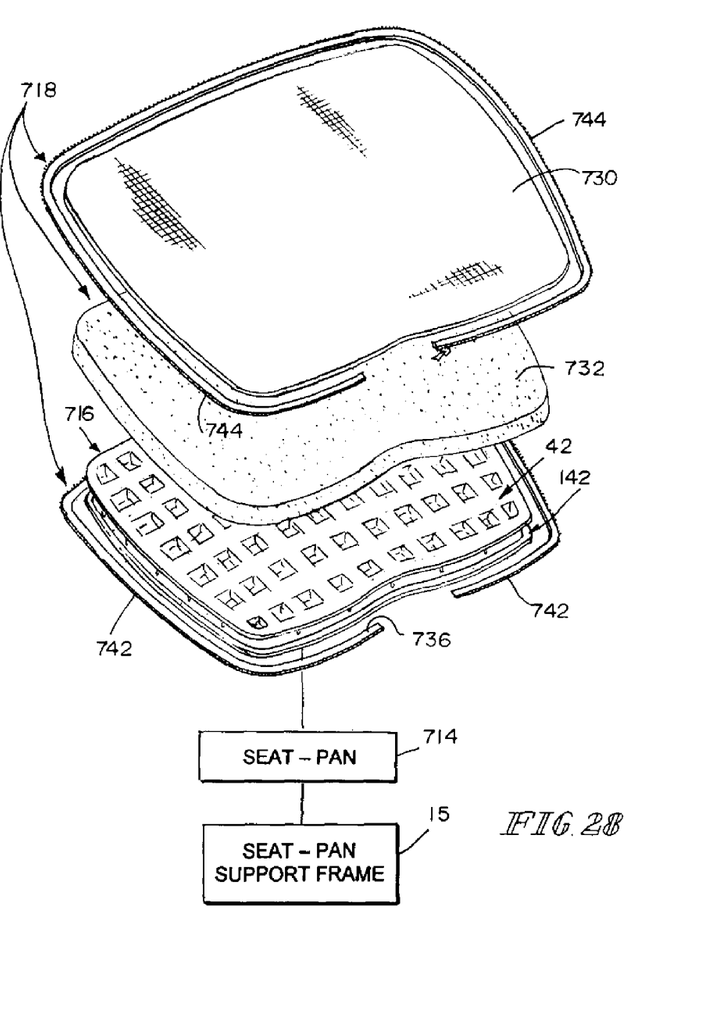
Figure 29:
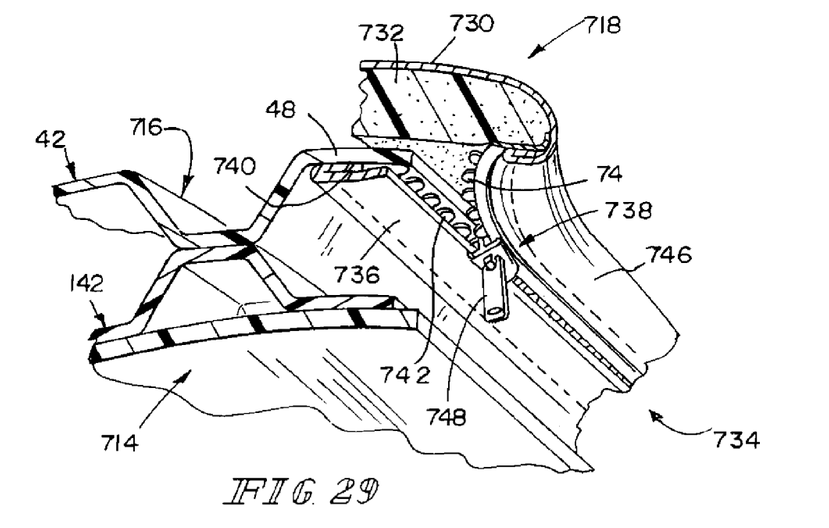
Figure 30:
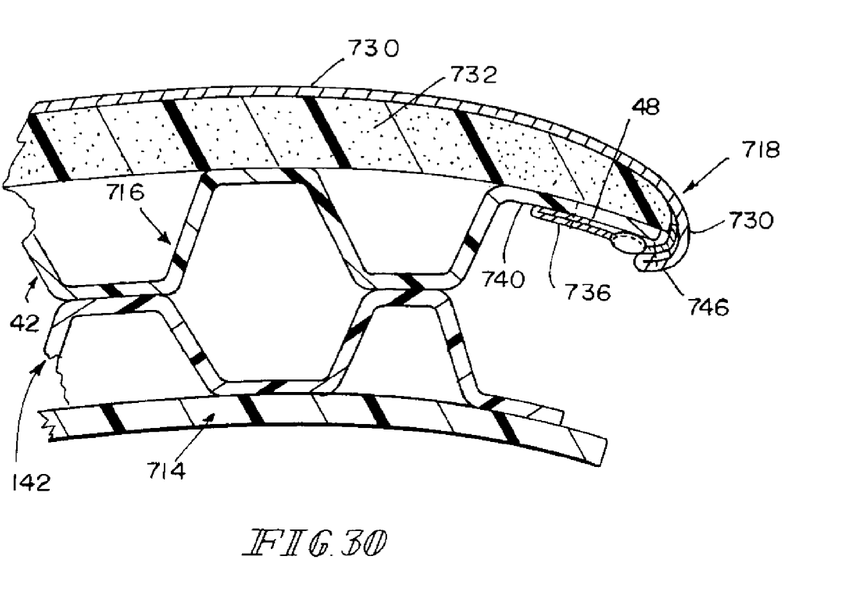

As suggested in FIGS. 28 and 30, cushion 716 includes a top shell 42 and a bottom shell 142 coupled to top shell 142 to form an elastic bed. Top shell 42 includes a cover-mount flange 48 along a perimeter edge thereof as shown best in FIGS. 29 and 30. Cushion cover 718 is arranged to cover top shell 42 and to mate with cover-mount flange 48 to retain cushion cover 718 in place on cushion 716.

Cushion cover 718 includes an outer sheet 730, and inner sheet 732, and a sheet anchor 734 including an anchor strip 736 coupled to cushion 716 and a fastener 738 configured to provide means for temporarily coupling outer sheet 730 to anchor strip 736 to retain outer and inner sheets 730, 732 in place on top shell 42 of cushion 716 as shown, for example, in FIGS. 29 and 30. Anchor strip 736 is coupled to underside 740 of cover-mount flange 48 using any suitable means. In illustrative embodiments, fastener 738 includes an inside zipper track 742 coupled to anchor strip 736, an outside zipper track 744 coupled to a perimeter edge 746 of outer sheet 730, and a sliding piece 748 mating with inside and outside zipper tracks 742, 744 to provide means for closing an opening to mate anchor strip 736 to outer sheet 730 by drawing together teeth included in each of the inside and outside zipper tracks 742, 744 to couple the outer sheet 730 temporarily to anchor strip 736 and retain cushion 716 in place on seat pan 714.

The invention claimed is:

1. An occupant-support base for a vehicle seat, the occupant-support base comprising a seat pan, a pad coupled to the seat pan, the pad including a cushion on the seat pan and a cushion cover coupled to a cushion channel formed in the cushion to locate the cushion between the seat pan and the cushion cover, wherein the cushion cover includes a drawstring carrier formed to include a first drawstring channel and arranged to mate with the cushion and a first drawstring arranged to extend through the first drawstring channel and configured to provide means for drawing the first drawstring carrier toward the cushion channel to retain the cushion cover on the cushion, and a cushion retainer spaced-apart from and separated from the cushion cover and wherein the cushion retainer is coupled to each of the cushion and the seat pan to retain the cushion in a stationary position on the seat pan, wherein the cushion includes a top surface facing upwardly toward the cushion cover, a bottom surface facing downwardly toward the seat pan, and a perimeter edge extending between the top and bottom surfaces, and wherein the cushion cover covers an upper portion of the perimeter edge of the cushion while the cushion retainer covers a lower portion of the perimeter edge of the cushion to cause an intermediate portion of the perimeter edge extending between the upper and lower portions to remain uncovered and exposed.

2. An occupant-support base for a vehicle seat, the occupant-support base comprising a seat pan, a pad including a cushion and a cushion cover coupled to the cushion, the cushion including a top surface facing upwardly toward the cushion cover, a bottom surface facing downwardly toward the seat pan, and a perimeter edge extending between the top and bottom surfaces, and a cushion retainer separated from the cushion cover and coupled to each of the cushion and the seat pan to retain the cushion in a stationary position on the seat pan, and wherein the cushion cover covers an upper portion of the perimeter edge of the cushion while the cushion retainer covers a lower portion of the perimeter edge of the cushion to cause an intermediate portion of the cushion extending between the upper and lower portions to remain exposed and uncovered and, wherein the cushion includes an elastic bed positioned to lie between the seat pan and the cushion cover, the cushion further includes a cover-mount flange coupled to the elastic bed, and the cushion cover includes an upper member arranged to mate with an upwardly facing surface of the cover-mount flange and a lower member arranged to lie in spaced-apart relation to the upper member and mate with a downwardly facing surface of the cover mount flange to trap the cover-mount flange between the upper and lower members.

3. The occupant-support base of claim 2, wherein the cushion further includes a retainer-mount flange coupled to the elastic bed and arranged to lie in spaced-apart relation to the cover-mount flange, the cushion retainer includes a folded sheet including a top rim arranged to mate with the retainer-mount flange, a bottom rim arranged to mate with the seat pan, and an outer rim arranged to interconnect the top and bottom rims and cover edge portions of the retainer-mount flange and the seat pan.

4. The occupant-support base of claim 2, wherein the seat pan includes a perimeter edge, the cushion retainer includes a perimeter flange coupled to the cushion and formed to include an edge-receiving channel receiving the perimeter edge of the seat pan therein, and the perimeter flange includes a top rim arranged to mate with an upwardly facing surface of the seat pan and a bottom rim arranged to mate with a downwardly facing surface of the seat pan, the perimeter edge of the seat pan is arranged to extend between the upwardly and downwardly facing surfaces.

5. An occupant-support base for a vehicle seat, the occupant-support base comprising
a cushion including a deformable elastic bed and a cushion-mount strip coupled to the deformable elastic bed, the cushion-mount strip extending away from the deformable elastic bed and the cushion-mount strip being formed to include an eyelet, and
a seat pan including a tray arranged to underlie the deformable elastic bed, a rim coupled to a perimeter portion of the tray and arranged to lie alongside the cushion-mount strip, and a fastener coupled to the rim and the cushion-mount strip to retain the cushion in a stationary position on the tray of the seat pan,
wherein the deformable elastic bed of the cushion includes a top shell and a bottom shell coupled to the top shell and positioned to lie between the top shell and the tray of the seat pan and the cushion-mount strip is coupled to the bottom shell.

6. The occupant-support base of claim 5, wherein the fastener includes a post coupled to the rim and arranged to pass through the eyelet and a head coupled to a free end of the post and arranged to lie in spaced-apart relation to the rim to trap a portion of the cushion-mount strip between the rim and the head.

7. The occupant-support base of claim 5, wherein the rim is formed to include a hole, the cushion-mount strip is positioned to lie alongside the rim to locate the eyelet in registry with the hole, and the fastener is arranged to extend through the eyelet and the hole to retain the cushion-mount strip in a stationary position on the rim.

8. An occupant-support base for a vehicle seat, the occupant-support base comprising
a seat pan,
a cushion coupled to the seat pan, the cushion including an elastic bed that includes a bottom surface facing downwardly toward the seat pan and a top surface facing upwardly opposite the bottom surface and a cover-mount flange coupled to the elastic bed,
a cushion cover coupled to the cover-mount flange of the cushion, and
a cushion retainer separated from the cushion cover and coupled to each of the elastic bed and the seat pan to retain the cushion in a stationary position on the seat pan, and wherein the cushion cover covers an upper portion of the cushion while the cushion retainer covers a lower portion of the cushion to cause an intermediate portion of the cushion extending between the upper and lower portions to remain exposed and uncovered.

* * * * *